United States Patent
Ryan et al.

(10) Patent No.: US 12,141,241 B2
(45) Date of Patent: *Nov. 12, 2024

(54) IMAGE PROCESSING SYSTEM

(71) Applicant: FotoNation Limited, Galway (IE)

(72) Inventors: Cian Ryan, Galway (IE); Richard Blythman, Galway (IE); Joseph Lemley, Galway (IE); Paul Kielty, Galway (IE)

(73) Assignee: FotoNation Limited (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,111

(22) Filed: Aug. 17, 2023

(65) Prior Publication Data

US 2023/0394120 A1 Dec. 7, 2023

Related U.S. Application Data

(63) Continuation of application No. 17/148,465, filed on Jan. 13, 2021, now Pat. No. 11,768,919.

(51) Int. Cl.
*G06V 10/25* (2022.01)
*G06F 18/25* (2023.01)
*G06N 3/08* (2023.01)

(52) U.S. Cl.
CPC .............. *G06F 18/25* (2023.01); *G06N 3/08* (2013.01); *G06V 10/25* (2022.01)

(58) Field of Classification Search
CPC ......... G06F 18/25; G06F 18/253; G06N 3/08; G06V 10/25; G06V 10/12; G06V 10/806; G06V 20/58; G06V 20/597; G06V 10/82
See application file for complete search history.

(56) References Cited

U.S. PATENT DOCUMENTS 9,398,214 B2 * 7/2016 Ahiska .................. H04N 23/698
2014/0333775 A1 * 11/2014 Naikal ............. H04N 21/44008
348/159

(Continued)

FOREIGN PATENT DOCUMENTS

EP 3440833 B1 8/2019
WO 2019145516 A1 8/2019

(Continued)

OTHER PUBLICATIONS

John Arevalo, et al., "Gated multimodal networks". Neural Comput. Appl. 32, 14 (Jul. 2020), pp. 10209-10228. https://doi.org/10.1007/s00521-019-04559-1.

(Continued)

*Primary Examiner* — Fayyaz Alam
(74) *Attorney, Agent, or Firm* — Lerner David LLP

(57) ABSTRACT

Disclosed is a multi-modal convolutional neural network (CNN) for fusing image information from a frame based camera, such as, a near infra-red (NIR) camera and an event camera for analysing facial characteristics in order to produce classifications such as head pose or eye gaze. The neural network processes image frames acquired from each camera through a plurality of convolutional layers to provide a respective set of one or more intermediate images. The network fuses at least one corresponding pair of intermediate images generated from each of image frames through an array of fusing cells. Each fusing cell is connected to at least a respective element of each intermediate image and is trained to weight each element from each intermediate image to provide the fused output. The neural network further comprises at least one task network configured to generate one or more task outputs for the region of interest.

20 Claims, 3 Drawing Sheets

(56) References Cited

U.S. PATENT DOCUMENTS

| | | | |
|---|---|---|---|
| 2020/0265567 A1* | 8/2020 | Hu | G06T 5/50 |
| 2021/0056701 A1 | 2/2021 | Vranceanu et al. | |

FOREIGN PATENT DOCUMENTS

| | | |
|---|---|---|
| WO | 2019145578 A1 | 8/2019 |
| WO | 2019180033 A1 | 9/2019 |

OTHER PUBLICATIONS

Nataprawira, Jason, et al. "Pedestrian detection using multispectral images and a deep neural network." Sensors 21.7 (2021): 2536. (Year: 2021).

C. Zhang, Z. Yang, X. He, and L. Deng, "Multimodal intelligence: Representation learning, information fusion, and applications," IEEE J. Sel. Top. Signal Process., 2020.

J.M. Perez-Rua, V. Vielzeuf, S. Pateux, M. Baccouche, and F. Jurie, "MFAS: Multimodal fusion architecture search," in Proceedings of the IEEE Conference on computer vision and 15 pattern recognition, 2019, pp. 6966-6975.

R. A. Jacobs, M. I. Jordan, S. J. Nowlan, and G. E. Hinton, "Adaptive mixtures of local experts," Neural Comput., vol. 3, No. 1, pp. 79-87, 1991.

J. Arevalo, T. Solorio, M. Montes-y-G6mez, and F. A. Gonzalez, "Gated multimodal units for information fusion," arXiv Prepr. arXiv1702.01992, 2017 and J. Arevalo, T. Solorio, M. Montes-y-Gomez, and F. A. Gonzalez, "Gated multimodal networks," Neural Comput. Appl.,pp. 1-20, 2020.

A. Valada, A. Dhall, and W. Burgard, "Convoluted mixture of deep experts for robust semantic segmentation," in IEEE/RSJ International conference on Intelligent Robots and Systems (IROS) workshop, state estimation and terrain perception for all terrain mobile robots, 2016, p. 23.

V. Vielzeuf, A. Lechervy, S. Pateux, and F. Jurie, "Centralnet: a multilayer approach for multimodal fusion," in Proceedings of the European Conference on Computer Vision (ECCV), 2018, p. 575-589.

R. Ranjan, S. Sankaranarayanan, C. D. Castillo, and R. Chellappa, "An all-in-one convolutional neural network for face analysis," in 2017 12th IEEE International Conference on Automatic Face & 10 Gesture Recognition (FG 2017), 2017, pp. 17-24.

R. Ranjan, V. M. Patel, and R. Chellappa, "Hyperface: A deep multi-task learning framework for face detection, andmark localization, pose estimation, and gender recognition," IEEE Trans. Pattern Anal. Mach. Intel I., vol. 41, No. 1, pp. 121-135, 2017.

S. Pini, G. Borghi, and R Vezzani, "Learn to see by events: Color frame synthesis from event and RGB cameras," in International Joint Conference on Computer Vision, Imaging and Computer Graphics Theory and Applications, 2020, vol. 4, pp. 37-47.

Posch, C, Serrano-Gotarredona, T., Linares-Barranco, B., & Delbruck, T. "Retinomorphic event-based 25 vision sensors: bioinspired cameras with spiking output", Proceedings of the IEEE, 102 (10), 1470-1484, {2014).

Scheerlinck, C., Rebecq, H., Gehrig, D., Barnes, N., Mahony, R and Scaramuzza, D., 2020, "Fast image reconstruction with an event camera", in IEEE Winter Conference on Applications of Computer Vision (pp. 156-163).

Elrasad, et al., U.S. Appl. No. 17/037,420, filed Sep. 29, 2020 entitled: Object Detection for Event Cameras.

Ryan, et al., U.S. Appl. No. 16/941,799, filed Jul. 29, 2020 entitled: Object Detection for Event Cameras.

Ryan, et al. U.S. Appl. No. 16/904,122 filed Jun. 17, 2020 entitled: Object Detection for Event Cameras.

International Search Authority/European Patent Office: "International Search Report and the Written Opinion of the International Searching Authority, or the Declaration," for International Application No. PCT/EP2021/078422, mailed Jan. 31, 2022, 12 pages.

Jiang Zhuangyi et al: "Mixed Frame-/Event-Driven Fast Pedestrian Detection", 2019 International Conference on Robotics and Automation (ICRA), IEEE, May 20, 2019 (May 20, 2019), pp. 8332-8338, KP033593869, DOI: 10.1109/ICRA.2019.8793924 [retrieved on Aug. 9, 2019], 7 pages.

Fang Xu et al: "Matching Neuromorphic Events and Color Images via Adversarial Learning" arxiv.org, Mar. 2, 2020 (Mar. 2, 2020), 10 pages.

Cao Hu et al: "Fusion-Based Feature Attention Gate Component for Vehicle Detection Based on Event Camera", IEEE Sensors, vol. 21, No. 21, Nov. 1, 2021 (Nov. 1, 2021), 9 pages (pp. 24540-24548).

Zhang Jiqing et al.: "Object Tracking by Jointly Exploiting Frame and Event Domain", Sep. 19, 2021 (Sep. 19, 2021), XP055882370, Retrieved from the Internet: URL:https://arxiv.org/pdf/21 09.09052. pdf, 10 pages.

* cited by examiner

IMAGE PROCESSING SYSTEM

CROSS-REFERENCE TO RELATED APPLICATIONS

The present application is a continuation of U.S. patent application Ser. No. 17/148,465, filed Jan. 13, 2021, the disclosures of which are incorporated herein by reference.

FIELD

The present invention relates to an image processing system.

BACKGROUND

Fusing information from multiple different sensors using multi-modal fusion architectures not only improves performance vis-à-vis single sensor based architectures but offers a greater degree of redundancy than duplicating sensors of the same type, as sensor fusion from different sensors can exploit the advantages and minimize the shortcomings of the individual sensors within a system.

C. Zhang, Z. Yang, X. He, and L, Deng, "Multimodal intelligence: Representation learning, information fusion, and applications," IEEE J. Sel. Top. Signal Process., 2020 discloses integrating information from different unimodal sensors into a single representation.

J.-M. Pérez-Rúa, V. Vielzeuf, S. Pateux, M. Baccouche, and F. Jurie, "MFAS: Multimodal fusion architecture search," in Proceedings of the IEEE Conference on computer vision and pattern recognition, 2019, pp. 6966-6975 discloses a co-attention mechanism where networks decide how to weight different modalities based on contextual information.

R. A. Jacobs, M. I. Jordan, S. J. Nowlan, and G. E. Hinton, "Adaptive mixtures of local experts," Neural Comput., vol. 3, no. 1, pp. 79-87,1991 discloses co-attention mechanisms where information is fused at decision-level.

J. Arevalo, T. Solorio, M. Montes-y-Gómez, and F. A. González, "Gated multimodal units for information fusion," arXiv Prepr. arXiv1702.01992, 2017 and J. Arevalo, T. Solorio, M. Montes-y-Gomez, and F. A. González, "Gated multimodal networks," Neural Comput. Appl., pp. 1-20, 2020 propose Gated Multimodal units (GMU), enabling feature-level fusion at any level in a network using imagery and text inputs. The GMU is capable of learning a latent variable that determines which modality carries useful information for particular inputs.

A. Valada, A. Dhall, and W. Burgard, "Convoluted mixture of deep experts for robust semantic segmentation," in IEEE/RSJ International conference on Intelligent Robots and Systems (IROS) workshop, state estimation and terrain perception for all terrain mobile robots, 2016, p. 23 propose a network with an adaptive gating network that determines how much and when to rely on each "expert" (modality).

V. Vielzeuf, A. Lechervy, S. Pateux, and F. Jude, "Centralnet: a multilayer approach for multimodal fusion," in Proceedings of the European Conference on Computer Vision (ECCV), 2018, p, 575-589 discloses a multi-modal network architecture which fuses information at multiple layers from individual networks for each modality.

The All-in-One and Hyperface-ResNet network architectures disclosed in: R. Ranjan, S. Sankaranarayanan, C. D. Castillo, and R. Chellappa, "An all-in-one convolutional neural network for face analysis," in 2017 12*th IEEE International Conference on Automatic Face & Gesture Recognition (FG 2017)*, 2017, pp. 17-24; and R. Ranjan, V. M. Patel, and R. Chellappa, "Hyperface: A deep multi-task learning framework for face detection, landmark localization, pose estimation, and gender recognition," IEEE Trans. Pattern Anal. Mach. Intell., vol. 41, no. 1, pp. 121-135, 2017 respectively apply fusion of intermediate layers in neural networks.

There is limited literature relating to multi-modal fusion with event cameras. S. Pini, G. Borghi, and R. Vezzani, "Learn to see by events: Color frame synthesis from event and RGB cameras," in International Joint Conference on Computer Vision, Imaging and Computer Graphics Theory and Applications, 2020, vol. 4, pp. 37-47 feed concatenated RGB and events as two input channels to their network, The event frames are created using fixed time windows. This removes many of the key characteristics of event cameras i.e. temporal resolution and response to fast motion.

SUMMARY

According to the present invention there is provided an image processing system according to claim 1.

In a second aspect there is provided an image processing method according to claim 16 as well as a computer program product configured to perform the method.

Embodiments of the present invention can comprise a multi-modal convolutional neural network (CNN) for fusing information from a frame based camera, such as, a near infra-red (NIR) camera and an event camera for analysing facial characteristics in order to produce classifications such as head pose or eye gaze.

Frame based cameras have limited temporal resolution by comparison to an event camera and so suffer from blur during fast motion of objects within the field of view of the camera. On the other hand, event cameras work best with object motion, but do not produce information when objects are still.

Embodiments of the present invention draw on the advantages of both by fusing intermediate layers in a CNN and assigning importance to each sensor based on the input provided.

Embodiments of the present invention generate sensor attention maps from intermediate layers at multiple levels through the network.

Embodiments are particularly suited for driver monitoring systems (DMS), NIR is a standard camera often used in DMS. These standard frame-based cameras suffer from motion blur. This is particularly true for high speed events such as vehicle collisions or other fast safety-critical events. Conversely, event cameras adapt to scene dynamics and can accurately track the driver with a very high temporal resolution. However, they are not especially suited to monitoring slow moving or stationary objects for example for determining driver attention.

Embodiments fuse both modalities in a unified CNN capable of incorporating the advantages of each modality and minimising their shortcomings. As a result, when implemented in DMS, the network can accurately analyse normal driving and rare events such as collision.

Moreover, inference can be run asynchronously based on the event camera outputs and so the network can adapt to scene dynamics rather than executing at a fixed rate.

This allows the DMS to sense and understand the driver state during vehicle collisions for accurate injury estimation or autonomous system intervention.

As well as DMS, embodiments can be applied to other tasks including external monitoring for autonomous driving purposes e.g. vehicle/pedestrian detection and tracking.

BRIEF DESCRIPTION OF THE DRAWINGS

An embodiment of the invention will now be described, by way of example, with reference to the accompanying drawings, in which.

DESCRIPTION OF THE EMBODIMENT

Figure 1:
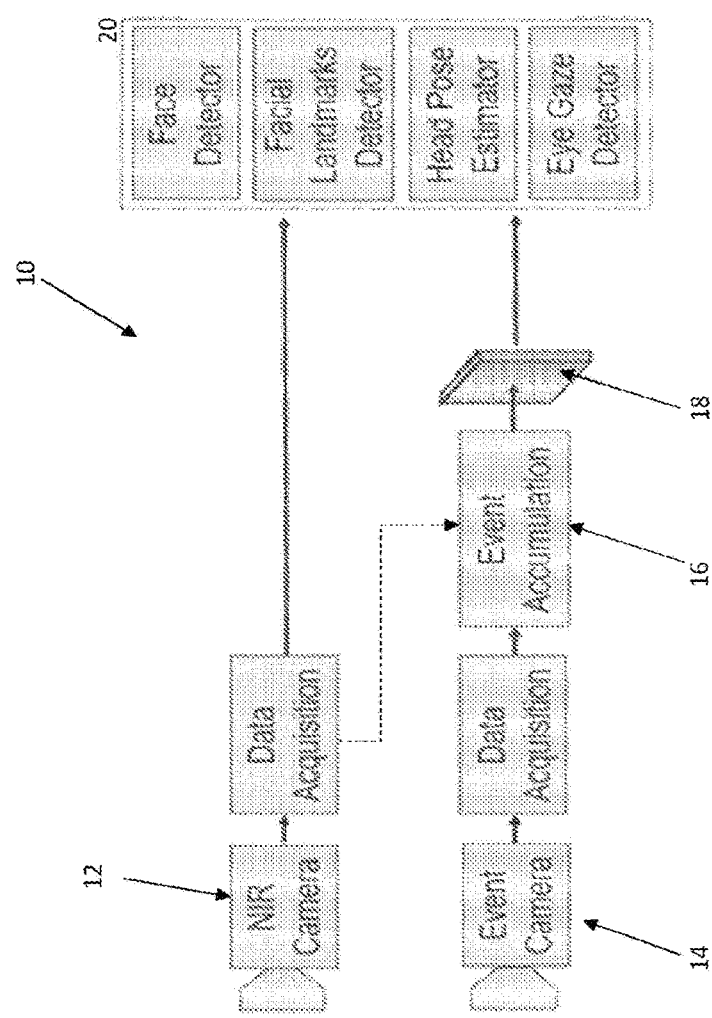
FIG. 1 shows a system for fusing information provided by a frame based NIR camera and an event camera according to an embodiment of the present invention.

Referring now to FIG. 1, there is shown an image processing system 10 according to an embodiment of the present invention. The system 10 comprises a frame-based camera 12, in this case, a camera sensitive to near infra-red (NIR) wavelengths and which produces frames of information at periodic intervals, typically at rates of between 30 but possibly up to 240 frames per second (fps). It will be appreciated that the frame rate can vary over time, for example, depending on context or environmental conditions, for example, high frame rates may not be possible or appropriate under low light conditions, but in general the data acquired and provided by the camera 12 to the remainder of the system comprises a frame of information spanning the entire field of view of the camera regardless of any activity within the field of view. It will also be appreciated that in alternative implementations, the frame-based camera may be sensitive to other wavelengths, such as visible wavelengths, and may provide either monochromatic, intensity only, frame information or polychromic frame information in any suitable format including RGB, VUV, LCC or LAB formats.

The system also includes an event camera 14, for example, of the type disclosed in Posch, C, Serrano-Gotarredona, T., Linares-Barranco, B., & Delbruck, T. "Retinomorphic: event-based vision sensors: bioinspired cameras with spiking output", Proceedings of the IEEE, 102(10), 1470-1484, (2014), European Patent No. EP3440833, PCT Application WO2019/145516 and PCT Application WO2019/180033 from Prophesee. Such cameras are based on asynchronously outputting image information from individual pixels whenever a change in pixel value exceeds a certain threshold—an event. Thus, pixels in an "event camera" report asynchronous "event" streams of intensity changes, characterised by x, y location, timestamp and polarity of intensity change.

Similar to the frame camera 12, the event camera 14 may be sensitive to NIR wavelengths or visible wavelengths and may provide monochromatic event information or polychromatic, for example, RGB, event information.

Events may be generated asynchronously, potentially as frequently as the clock cycle for the image sensor and the minimum period of time within which an event may occur is referred to herein as an "event cycle".

When employed within a driver monitoring system (DMS) each of the cameras 12, 14 can be mounted towards the front of a vehicle cabin, for example on or in the vicinity of a rear view mirror and facing rearwards towards any occupants of the cabin.

The cameras 12, 14 may be spaced apart somewhat and this stereoscopic point of view may assist with certain tasks such as detecting a head pose of an occupant as explained in more detail below.

Nonetheless, it will be appreciated that in general the respective fields of view of the cameras 12, 14 substantially overlap to the extent that they can each image the face of any one or more occupants of interest within the vehicle when in a typical range of positions within the cabin.

Nonetheless, it should also be appreciated that the cameras 12, 14 need not be discrete units and in some implementations, the frame and event camera functionality can be provided with a single integrated sensor such as a Davis 346 camera available at iniVation.com. This of course can reduce the need for dual optical systems.

As explained, rather than the frames of information provided by the camera 12, the event camera 14 provides streams of individual events as they occur.

In embodiments of the present invention, this event information acquired and provided by the event camera 14 is accumulated by an event accumulator 16 and the accumulated event information is then employed to reconstruct textural type image information which is then provided in an image frame format 18 for further processing by the system.

Well-known neural network-based event camera reconstruction methodologies include: E2VID and Firenet discussed in Scheerlinck, C., Rebecq, N., Gehrig, D., Barnes, N., Mahony, R. and Scaramuzza, D., 2020, "Fast image reconstruction with an event camera", in IEEE Winter Conference on Applications of Computer Vision (pp. 156-163) which provide image frame information from event information.

Further examples of methods and systems for accumulating event information and providing frame information are disclosed in U.S. patent application Ser. No. 17/037,420 entitled "Object Detection for Event Cameras" filed 29 Sep. 2020 which is a continuation in part of U.S. application Ser. No. 16/941,799 filed 29 Jul. 2020 which is a continuation in part of U.S. application Ser. No. 16/904,122 filed 17 Jun. 2020, the disclosures of which are incorporated herein by reference. These systems can identify a region of interest, such as a face region within the field of view of an event camera and once a specified number of events, for example, 20,000, has accumulated within the face region, a textural image frame for the face region can be generated.

Using one such method, the event accumulator 16 keeps a count of events occurring at each pixel location in a face region in a time window during which the event accumulator 16 acquires events for providing the image frame 18. A net polarity of events occurring at each pixel location during the time window is determined and a decay factor for each pixel location as a function of the count is generated. The decay factor is applied to a textural image generated for the face region prior to the current time window; and the net polarity of events occurring at each pixel location is added to corresponding locations of the decayed textural image to produce the textural image for the current time window. This allows pixels within the frame 18 provided by the event accumulator 16 to maintain information over the time window, a form of motion memory, while image frames produced by the camera 12 only comprise relatively instantaneous information from the exposure window of the frame.

In addition or as an alternative to using a count to generate a decay factor, it is also possible to decay events as a function of time when accumulating the image frame 18.

These methods are particularly useful for the present application, as in a DMS system, the location and characteristics of a vehicle occupant's face region, such as facial landmarks, head pose, eye gaze and any occlusion are of prime concern.

Nonetheless, in some embodiments of the invention, as an alternative or in addition, a detector provided with frame information from the frame based camera 12 can be used to identify one or more regions of interest, such as face regions, within the field of view of the camera 12 and these can be mapped to corresponding regions within the field of view of the camera 14 taking into account the spatial relationship of the cameras 12, 14 and the respective camera models, so that event information for one or more face regions within the field of view of the event camera 14 can be accumulated into respective image frames.

It will be appreciated that frames acquired from the frame based camera 12 will arrive periodically in accordance with the frame rate set for the camera 12. On the other hand, frames 18 can be produced by the event accumulator 16 asynchronously, theoretically with a temporal resolution as small as one event cycle.

When there is a large amount of movement within a region of interest within the field of view of the event camera 14, then frames 18 can be produced quite frequently by the event accumulator 16 and in any case more frequently than produced by the frame based camera 12.

Figure 2:
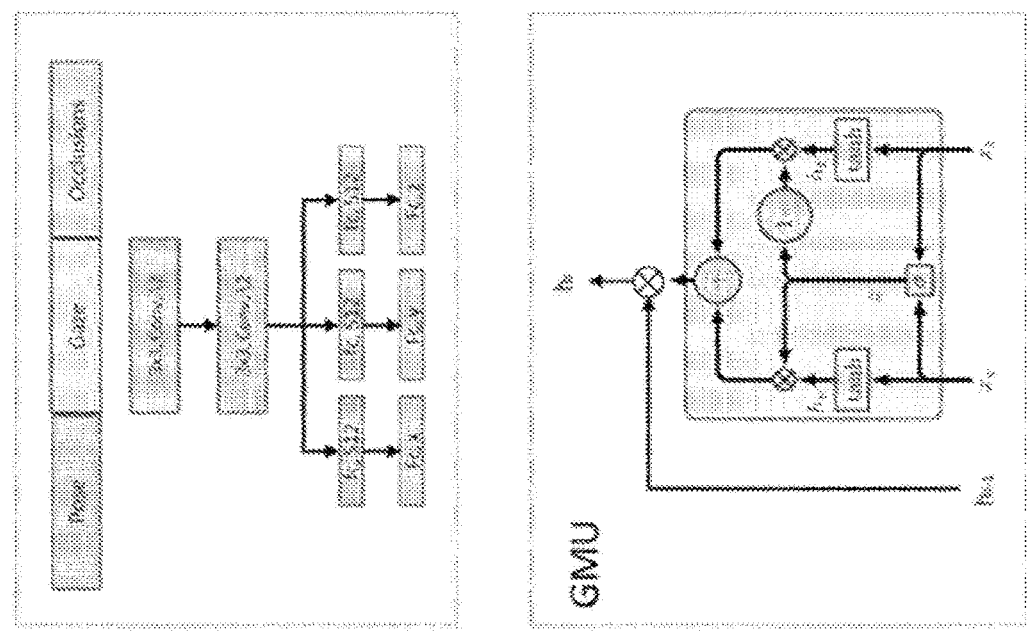
FIG. 2 shows a network for multi-modal facial analysis for use within the system of FIG. 1.
Figure 2:
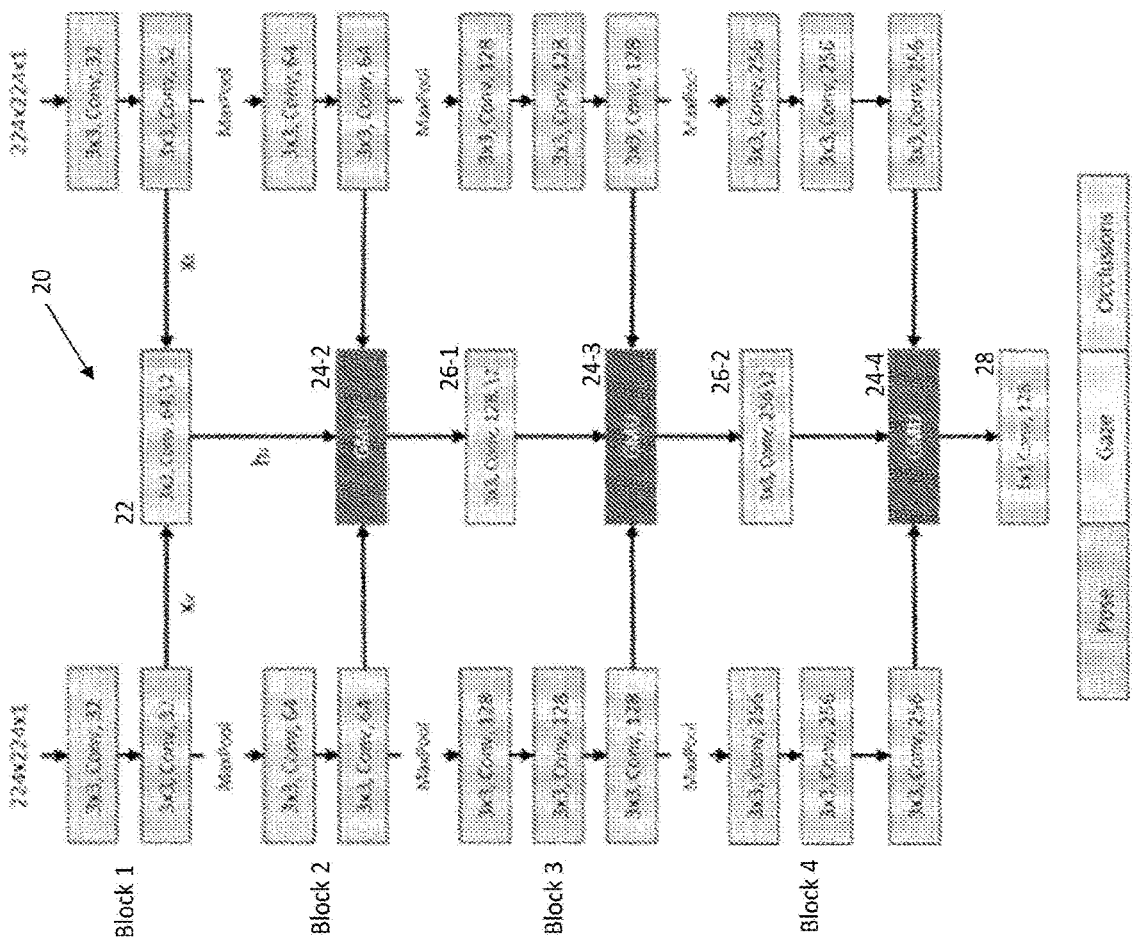

In embodiments of the present invention, a neural network 20, FIG. 2, is applied to the most recent frame provided by the accumulator 16 as well as the most recent frame provided by the frame based camera 12.

This implies that, given enough object motion, the neural network 20 might run several times before a new NIR image frame is provided by the frame camera 12.

Nonetheless, in some embodiments of the invention, if an updated frame 18 has not been provided by the event accumulator 16 in the interval between frames provided from the camera 12, the network 20 can be re-executed with the latest NIR image and either: the last available frame produced by the event accumulator 16; or the event accumulator 16 could be requested to produce a frame for the required region of interest based on whatever events have been generated, if any, since its last frame.

This means that the network 20 will run at a minimum of the frame rate of the camera 12 regardless of motion. So, for a camera 12 running at 30 fps, if the elapsed time taken to accumulate 20,000 events is greater than 0.033 seconds (equivalent to 30 fps), the network will be executed.

In either case, the most recently acquired NIR image is used while the network 20 reacts to scene dynamics provided by the event camera 14. As a result, the event image frame will tend to be "ahead of time" and essentially represent the NIR image+movement.

While this temporal misalignment between image frames provided by the camera 12 and the event accumulator 16 may be considered a problem, it will be appreciated from the description below that the approach of the present application is not adversely affected by this temporal misalignment when determining the characteristics of any faces detected within the fields of view of the cameras 12, 14.

Referring now to FIG. 2 in more detail, the network 20 comprises two inputs, a first for receiving an image frame corresponding to a facial region detected by the frame camera 12 and a second for receiving an image frame corresponding to a facial region detected within a frame provided by the event accumulator 16.

As will be seen, each input comprises an intensity only 224×224 image and so prior to being provided to the network 20, each facial region image frame will need to be upsampled/downsampled (normalised) as required so that it is provided at the correct resolution.

Each input image frame is processed by a network comprising 4 successive blocks of 2 or 3 convolutional layers, with each of Blocks i=1 to 3 being followed by a Maxpool layer, similar to a truncated VGG-16 network.

In FIG. 2, each block displays the kernel size (3×3), layer type (Conv/MaxPool number of output filters (32, 64, 128, 256) and kernel stride (\2), where applicable.

Note that while the structures of the network processing each of the inputs is the same, the weights employed within the kernels of each convolutional layer may not correspond and as will be appreciated are learned during network training.

The intermediate outputs $(x_v, x_t)$ of Block i=1 are fused in a simple convolution 22 to produce a fused output $h_i$.

The intermediate outputs of Block i=2, 3 and 4 along with the fused output $(h_{i-1})$ of their immediately previous block are fused using a respective Gated Multimodal Unit (GMU), 24-2, 24-3, 24-4. Each GMU 24 comprises an array of GMU cells of the type proposed in Arevalo et al referenced above and shown in more detail on the right hand side of FIG. 2. Each GMU cell is connected to a respective element of the vectors $x_v$, $x_t$ and $h_{i-1}$ and produces a fused output $h_i$ for the cell, where:

$h_v = \tanh(W_v \cdot x_v)$
$h_t = \tanh(W_t \cdot x_t)$
$z = \sigma(W_z \cdot [x_v, x_t])$
$h_i = h_{i-1} * (z * h_v + (1-z) * h_t)$ with
  $\{W_v, W_t, W_z\}$ being learned parameters;
  $[\cdot, \cdot]$ indicating the concatenation operator; and
  $\sigma$ representing a gate neuron which controls the contribution of the feature $x_v$, $x_t$ to the overall output of the cell $h_i$.

These GMUs 24 enable the network 20 to combine modalities and place higher importance to the modality that is likely to give a better estimate.

So, for example, it is expected that in a scene experiencing significant movement, the image frame provided by the camera 12 will tend to be blurred and exhibit low contrast. Any of the one or more frames provided by the event accumulator at or after the time of acquisition of such a blurred frame should be sharp and so with a suitable training set, the network 20 can be trained to favour information from such frames from the event camera side of the network in those circumstances.

On the other hand, during times of low motion, higher contrast images from the frame camera 12 will tend to be weighted by the GMUs 24 much more strongly than the last available image frame provided by the event accumulator 16, and so even though an image frame of indeterminate age may be available when processing a sharp image from the frame camera 12, this image information will tend not to be weighted strongly by the GMUs 24. In any case, the less movement that there has been in a scene, the less any image information from the event camera 14 will tend to deteriorate any information available from the frame camera 12.

Furthermore, as the output of each convolutional block $x_v$, $x_t$ as well as the fused outputs $h_i$ of the convolution layer 22 and the GMUs 24 comprise a respective vector whose individual elements are interconnected, this gives the network the possibility of responding differently to different spatial regions of respective images provided by the camera 12 and event accumulator 16.

In the network of FIG. 2, sensor information is combined by the convolutional layer 22 and the GMUs 24 and weighted at 4 different levels w thin the network. This enables importance to be placed on lower-level features of one sensor 12, 14 and higher-level features of another or vice versa. Nonetheless, it will be appreciated that the network architecture can be varied, for example, to improve real-time performance, GMU fusion could be applied just once or twice at earlier layers to reduce computational cost.

It will be noted that convolutions 26-1 and 26-2 are performed between the outputs and inputs of GMUs 24-2 and 24-3 as well as GMUs 24-3 and 24-4 in order to match the downsampling of the intermediate outputs of Blocks 3 and 4.

Following the final feature fusion in the GMU 24-4, a 1×1 convolution 28 is used to reduce the dimensionality of feature vector provided by the final GMU.

In the embodiment, the feature vector provided by the convolution 28 can be fed into one or more separate task-specific channels.

An exemplary generic structure for such channels is shown on the top right of FIG. 2.

In general, each such channel can comprise one or more further convolutional layers followed by one or more fully connected (fc) layers with the one or nodes of the last fully connected layer providing the required output.

Exemplary facial characteristics which can be determined using this structure include, but are not limited to: head pose, eye gaze and occlusions.

Head pose and eye gaze can be expressed using 3 (x,y,z) and 2 (x,y) output layer nodes respectively; in the case of head pose corresponding to the pitch, yaw and roll angles of the head respectively; and in the case of eye gaze corresponding to yaw and pitch angles of the eyes.

Accurate estimation of head pose allows for the calculation of the angular velocity of the head. So, for example, knowing the initial direction of the head during an impact can provide contextual information for a DMS to take more intelligent action in the event of a collision.

Eye gaze angles can provide information regarding whether a driver anticipated a collision. For example, a driver looking in the rear-view mirror during a rear-end collision might indicate an awareness of a possible collision. Tracking pupil saccades toward the colliding object the system to calculate the time-to-react and whether an Advanced Driver Assistance System (ADAS) intervention is required, for example, autonomous emergency braking.

Note that both head pose and eye gaze are to determined for the face as it appears within the face region images provided to the network and so are relative. Knowledge of the relationship between the image plane and the cameras 12, 14 is required to provide absolute locations for the head or absolute angles for eye gaze.

Occlusions can be indicated by a respective output node (x or y) corresponding to: an indication of eye occlusion (that the occupant is wearing glasses); and an indication of mouth occlusion (that the occupant appears to be wearing a mask).

Figure 3:
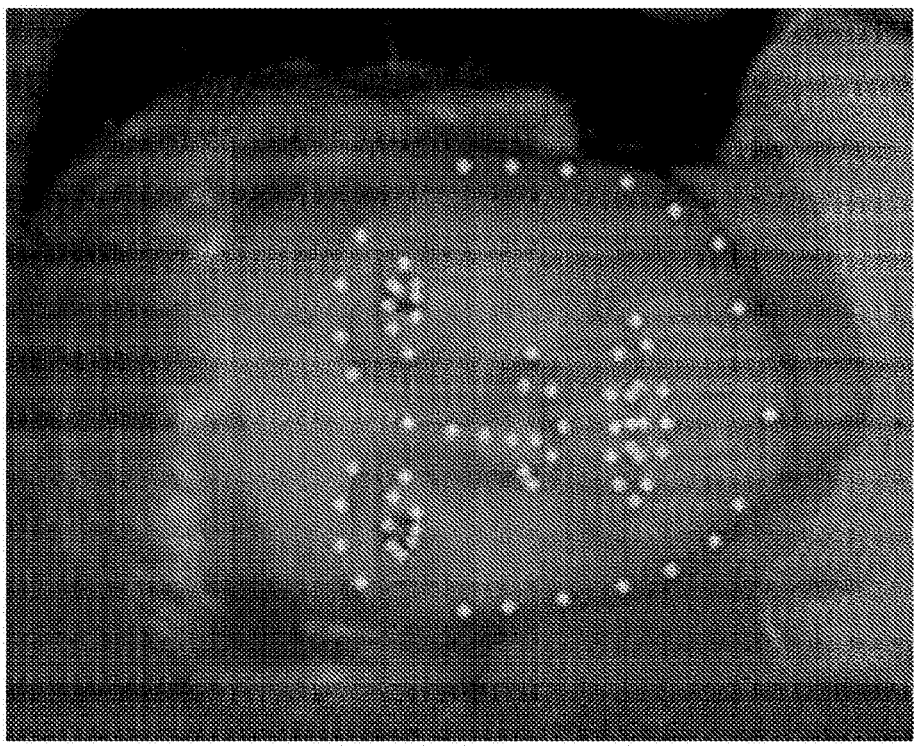
FIG. 3 illustrates facial landmarks which can be detected according to an embodiment of the invention.

Other forms of facial characteristics include facial landmarks such as discussed in PCT Application WO2019/145578 (Ref: FN-630-PCT) and U.S. application Ser. No. 16/544,238 entitled "Method of image processing using a neural network" filed on 19 Aug. 2019 and which comprise a set of locations of points of interest around a face region as shown for example in FIG. 3.

To produce such landmarks however, the feature vector produced by the convolution layer 24 might beneficially, be provided to a decoder network as well as a fully connected network of the type of network disclosed in U.S. application Ser. No. 16/544,238 filed on 16 Aug. 2019 and entitled "Method of image processing using a neural network", the disclosure of which is herein incorporated by reference.

In relation to training, multi-task learning improves learning efficiency and performance of individual tasks in this case: eye gaze, head pose and facial occlusions.

It is desirable to take into account the limitations of the NIR camera 12 (blur) and the event camera 14 (no motion) so that when training the network 20 learns when to trust one camera over the other. Thus, the following augmentation methods can be incorporated:

1. To encourage the reliance on the NIR camera 12, the number of events in some portions of the training set can be limited to reflect limited motion. With fewer events, the attention mechanism should weight the NIR camera more.
2. To encourage the reliance of event cameras, random motion blur can be applied to other portions of the training set of NIR camera 12 images, reflecting very fast object motion. This should be the case during a collision where the NIR is vulnerable to blur and lacks the temporal resolution.

While the above embodiment has been described in terms of fusing two modalities, it will be appreciated that it is possible to extend the cells of the convolution layer 22 and the GMUs 24 to fuse more than two inputs allowing the network 20 to be expanded to fuse more than two modalities.

The invention claimed is:

1. An image processing system comprising:
a frame based camera configured to periodically provide an image frame covering a field of view of the camera;
an event camera having a substantially common field of view and configured to provide event information in response to an event indicating a detected change in light intensity at an x,y location within the field of view of the event camera exceeding a threshold;
a detector for identifying a region of interest within the common field of view;
an accumulator for accumulating event information from a plurality of events occurring during successive event cycles within said region of interest;
a neural network configured to receive an image frame from the frame based camera and an image frame from the accumulator for the region of interest, the neural network being configured to process each image frame through a plurality of convolutional layers to provide a respective set of one or more intermediate images, wherein the one or more intermediate images are fused using an array of fusing cells that are arranged in a linear and sequential manner.

2. The image processing system according to claim, 1 wherein each fusing cell is connected to at least a respective element of each intermediate image.

3. The image processing system according to claim 2, wherein the neural network is configured to fuse at least one corresponding par of intermediate images generated from each of said image frames.

4. The image processing system according to claim 3, wherein each fusing cell for a pair of intermediate images is further connected to a respective element of a fused output from a previous pair of intermediate images.

5. The image processing system according to claim 1, wherein each fusing cell is configured to produce a fused output hi for the cell, according to the following functions:

$h_v = \tanh(W_v \cdot x_v)$
$h_t + \tanh(W_t \cdot x_t)$
$z = \sigma(W_z \cdot [X_v, x_t])$ $h_i = h_{i-1} * (z * h_v + (1-z) * h_t)$ with $x_v, x_t$, being element values from each intermediate image;

$\{W_v, W_t, W_z\}$ being learned parameters;

$H_{i-1}$ being an element value of the fused output from a previous pair of intermediate images;

$[\cdot, \cdot]$ indicating a concatenation operator; and $\sigma$ represent a gate neuron.

6. The image processing system according to claim 4, wherein said neural network is configured to fuse a first pair of intermediate images through a convolutional layer.

7. The image processing system according to claim 1, wherein said neural network further comprises one or more pooling layers between said plurality of convolutional layers.

8. The image processing system according to claim 1, wherein said neural network is further configured to match a resolution of the image frame from the frame base camera and the image frame from the accumulator to a size required by the neural network.

9. The image processing system according to claim 1, wherein the region of interest comprises a face region.

10. The image processing system according to claim 9, further comprising a respective task network for providing one of: head pose, eye gaze of indicating a face occlusion.

11. The image processing system according to claim 10, wherein each task network comprises one or more convolutional layers followed by one or more fully connected layers.

12. The image processing system according to claim 11, wherein an output layer for said head pose task network comprises three output nodes; an output layer for said eye gaze task network comprises two output nodes; and an output layer for said task network indicating a face occlusion comprises an output node for each type of occlusion.

13. The image processing system according to claim 9, further comprising a task network for providing a set of facial landmarks for said face region.

14. The image processing system according to claim 1, wherein said detector is configured to identify the region of interest within said image frame provided by said frame based camera.

15. The image processing system according to claim 1, wherein said detector is configured to identify the region of interest from event information provided by said event camera.

16. The image processing system according to claim 1, wherein said frame based camera is sensitive to near infrared (NIR) wavelengths.

17. A driver monitoring system comprising the image processing system of claim 1, said image processing system being configured to provide one or more task outputs to an advanced driver assist system (ADAS).

18. An image processing method operable in a system comprising: a frame based camera configured to periodically provide an image frame covering a field of view of the camera; and an event camera having a substantially common field of view and configured to provide event information in response to an event indicating a detected change in light intensity at an x,y location within the field of view of the event camera exceeding a threshold, the method comprising;

identifying a region of interest with the common field of view;

accumulating event information from a plurality of events occurring during successive event cycles within said region of interest, each event indicating an x,y location within said region of interest;

receiving an image frame from the frame based camera and an image frame from the accumulator for the region of interest;

processing each image frame through a plurality of convolutional layers to provide a respective set of one or more intermediate images, wherein the one or more intermediate images are fused using an array of using cells that are arranged in a linear and sequential manner.

19. The image processing method of claim 18, wherein each fusing cell is connected to at least a respective element of each intermediate image.

20. A computer program product comprising computer readable instructions stored on a non-transitory computer-readable medium which when executed on a computing device are configured to perform the steps of claim 19.

* * * * *